United States Patent Office 3,814,742
Patented June 4, 1974

3,814,742
ACRYLAMIDE-STYRENE COPOLYMERIZATION BY HIGH-SPEED SHEAR AGITATION OF AQUEOUS MEDIUM CONTAINING POLYACRYLAMIDE
Daniel Elmer Nagy, Stamford, Conn., assignor to American Cyanamid Company, Stamford, Conn.
No Drawing. Filed Mar. 23, 1973, Ser. No. 344,464
Int. Cl. C08f 15/02
U.S. Cl. 260—88.1 PN    7 Claims

ABSTRACT OF THE DISCLOSURE

Acrylamide is copolymerized with styrene in oxygen-free aqueous medium containing a styrene-soluble initiator and 0.2%–2% by weight of a polyacrylamide having a molecular weight above 500,000, the mixture being agitated by a shear-type stirrer having a tip-speed above 15 ft./sec.

---

The present invention relates to the emulsion copolymerization of styrene with acrylamide in aqueous medium. More particularly, the invention relates to such a process which is performed in the absence of customary emulsifying and dispersing agents, with application of shear force to the emulsified styrene.

It is known that styrene can be copolymerized with acrylamide in aqueous medium, provided the styrene (which is insoluble in water) is in emulsified state. Up to the present, the copolymerization has been effected by adding an anionic emulsifying agent (typically a carboxylic acid or sulfo soap, or a half ester of sulfuric acid with a higher alkanol) to the reaction mixture (together with an initiator for the reaction), and agitating the mixture in the absence of elemental oxygen sufficiently to emulsify the styrene. It has not been considered necessary to agitate the reaction mixture more vigorously than is required for this purpose. Styrene emulsifies easily, and in the laboratory, where a propeller type or paddle type agitator is used, a tip speed of about 4 ft./sec. provides adequate stirring. By "tip speed" is meant the speed at which the outside edge of the stirrer rotates.

The emulsifying agents used are drawbacks to the process, because they are substantial items of cost, and because they act as elements of pollution when the spent aqueous phase of the reaction mixture is discharged into streams or lakes. Moreover, in certain instances the agents impart undesirable characteristics to the polymer product of the reaction.

The discovery has now been made that styrene can be copolymerized with acrylamide in aqueous medium in the absence of an emulsifying agent provided three conditions are met. First, the reaction mixture must contain a small amount of a water-soluble polyacrylamide. Second, the initiator must be of the oil-soluble (i.e., styrene-soluble) type. Thirdly, the emulsified styrene must be subjected to shear force during the polymerization.

More in detail, a preferred embodiment of the process of the present invention consists essentially in forming a dilute aqueous solution of a water-soluble polyacrylamide, adding to the solution the styrene and acrylamide to be copolymerized, together with an oil-soluble initiator for the copolymerization reaction, and maintaining the resulting emulsion under an inert atmosphere at copolymerization temperature until the copolymerization reaction is completed while subjecting the reaction mixture to a force which emulsifies the styrene and subjects the emulsified droplets to shear.

The reason why the polyacrylamide provides such effective copolymerization when coupled with shear-type agitation is not known, and applicant does not wish to be bound by any theory. The present invention runs counter to experience, because high shear agitation is avoided in emulsion polymerization or such agitation usually causes emulsions to coagulate.

The maximum effective amount of agitation has not been ascertained, and consequently I do not wish to be limited in that regard.

The materials can be added to the water simultaneously, it being understood that the reaction mixture must be free from oxygen and other similarly reactive gases on addition of the initiator. If desired, the styrene and the acrylamide may be added as a premix.

The reaction mixture may include minor amounts, less than about 25% of the combined weight of the styrene and acrylamide, of such other vinyl monomers as are or may be present without changing the essential character of the copolymer. Such other vinyl monomers include ethylene, vinyl acetate, methyl acrylate, ethyl acrylate, maleimide, and chlorostyrene.

The polyacrylamide referred to above, which must be present in the reaction mixture, is of high and preferably very high molecular weight. Good results are obtained with polyacrylamides having a molecular weight of about 500,000, but substantially better results are obtained when the polyacrylamide has a molecular weight in the range of 1,000,000 to 5,000,000. Polyacrylamide of still higher molecular weight may be used, but such ultra-high molecular weight polyacrylamides become degraded by the shear forces present and so do not provide proportionately greater benefits.

The amount of polyacrylamide needed can be readily found by trial. Suitable amounts lie in the range of 0.2% and 2% on the weight of the water, but larger and smaller amounts may be operative.

The styrene and acrylamide can be copolymerized in weight ratio between about 9:10 and 10:90. The product of the copolymerization thus may be a latex (as when the ratio is 90:10) or a solution (as when the ratio is 10:90).

Benzoyl peroxide, cumene hydroperoxide and t-butyl-hydroperoxide are suitable for use as initiators in the process of the present invention. Any other vinyl polymerization initiator which is soluble in monomeric styrene can also be used.

The initiators are used in respectively conventional amounts which are known in the prior art or which can be found by trial. Between 0.5% and 3% of initiator based on the weight of the vinyl monomers thus is generally sufficient. The polymerization is performed in the customary temperature range of about 25° C. to 90° C.

The proportion of the vinyl monomers to the water should be such that the reaction mixture remains fluid (i.e., stirrable) during the polymerization. The precise maximum proportion in any instance depends primarily on the molecular weight of the copolymerization product, and this in turn depends chiefly on the amount and type of catalyst, and on the temperature of the reaction. A suitable proportion, however, can be found in any instance by laboratory trial. Generally, satisfactory results are obtained where the weight of the monomers to be interpolymerized is between about 5% to 30% and, better, 10% to 25% of the weight of the water.

In the past, the agitation of styrene-acrylamide aqueous copolymerization mixtures has generally been effected by stirrers which primarily effect translational stirring, that is, stirrers which cause bulk circulation of the reaction mixture from one part of the reaction vessel to another. Styrene is easy to emulsify in the presence of conventional emulsifying agents, and slow translational stirring has proved adequate to emulsify the styrene, to maintain a uniform cross sectional temperature of the reaction mixture, and to distribute additional initiator rapidly and uniformly through the reaction mixture when such addition is necessary. Occasionally, it becomes necessary to thin the reaction mixture as the polymerization reaction proceeds by addition of water, and translational stirring is likewise effective in distributing such added water uniformly throughout the reaction mass.

Translational stirring is customarily effected by propeller-type and paddle stirrers. Such stirrers have maximum (tip) speeds of less than about 10 ft./sec. In the laboratory, paddle-type stirrers have a tip speed of about 3–5 ft./sec. depending on their diameter. They are rotated at slow speed, typically 200 r.p.m.

In the process of the present invention, the reaction mixture is subjected to agitation of the shear type, that is, to agitation which provides high impact forces on the emulsified phase without necessarily causing more than slight agitation of the translational type. Shear type agitation is conveniently effected by rotating a shaft which carries one or more wires transversely therethrough; passage of the outer portions or tips of the wires at high speed through the reaction mixture emulsifies the styrene present and subjects the emulsified particles to shear forces. In the laboratory, stirrers of this type are known as Hirschberg stirrers. The wires are sufficiently thick and rigid so that they do not bend more than negligibly when rotated at operating speeds, and are sufficiently long so that they extend close to the walls of the reaction vessel. Thus by use of such stirrers, it is readily feasible to subject substantially the entire bulk of the reaction mixture to continuous shear-type agitation.

The process of the present invention does not exclude translational type agitation as is customary, and in large-scale operations it may be desirable to provide the shaft of a Hirschberg-type stirrer with an inner shaft extending therethrough which will permit a conventional propeller-type agitator to be mounted at the bottom thereof and to be independently operated as to provide conventional bulk agitation as may be needed.

Provision of such bulk agitation is an optional and not a characterizing feature of the present invention.

Styrene-acrylamide copolymers are known in the prior art and the products of the present invention are useful for the same purposes as the products of the prior art. Thus they are useful as surface sizes and sealants for paper and for other fibrous and porous structures including fiberboard and cement. The 50:50 copolymer emulsion is a valuable paper size, and can be advantageously applied at the size press when diluted to 0.1%–3% polymer solids content. When applied thickly to fibrous structures and allowed to dry, it forms an adherent protective film thereover and thus acts as a surface sealant for fiberboard.

In the specification, the term "emulsions" has been used in its customary sense to include both liquid-in-liquid and solid-in-liquid dispersions.

The invention is illustrated by the examples which follow. These examples are best embodiments of the invention and are not to be construed in limitation thereof.

EXAMPLE 1

The following illustrates the process of the present invention applied in the laboratory to the polymerization of styrene and acrylamide in 50:50 weight ratio.

To 400 cc. of water at 70° C. in a spherical 1,000-cc. reaction flask 5" in diameter provided with a Hirschberg-type stirrer, nitrogen gas inlet tube and heating mantle is added 4.0 g. (dry basis) of a polyacrylamide having a molecular weight of about 1,000,000, which is allowed to dissolve. The stirrer is a glass rod ¼" diameter carrying an integral glass stud or button transversely at one end thereof, a 6"-length of stiff corrosion-resistant wire being tightly and immovably twisted about the stud, each end of the wire being 3" long. The polyacrylamide is added as a wet hydrous gel. The stirrer is rotated at 1,000 r.p.m. (tip speed of wires=25 ft./sec.). There is then added 50 g. (0.48 mole) of styrene and 50 g. (0.71 mol) of acrylamide, together with 0.2 g. of 2,2'-azobisisobutyronitrile as initiator; 0.25 g. more of the initiator is added three hours later. The reaction mixture is maintained at 70° C. with continued rapid stirring until polymerization is substantially complete, and the mixture is then cooled to room temperature. An aqueous solution of a styrene-acrylamide polymer is obtained which is much more viscous than is usually obtained at that temperature.

EXAMPLE 2

The procedure of Example 1 is repeated except that the speed of the stirrer is increased to 1,500 r.p.m. A similar solution is obtained.

EXAMPLE 3

The procedure of Example 1 is repeated except that the weight of styrene added is increased to 80 and the weight of acrylamide is decreased to 20. A white viscous latex is obtained.

EXAMPLE 4

The procedure of Example 1 is repeated except that the weight of styrene is decreased to 20 and acrylamide is increased to 80. A viscous solution is obtained.

What is claimed is:

1. A process for the copolymerization of acrylamide with styrene which consists essentially in forming a stirrable oxygen-free reaction mixture of water, styrene, acrylamide, 0.2% to 2% based on the weight of the water of a water-soluble polyacrylamide having a molecular weight in excess of 500,000 and an effective amount of a styrene-soluble initiator for said polymerization, said styrene and acrylamide being present in 90:10 to 10:90 weight ratio, and continuously passing a shear-type stirrer transversely through said mixture at a tip speed in excess of 15 ft./sec.

2. A process according to claim 1 wherein the polyacrylamide has a molecular weight of 1,000,000 to 5,000,000.

3. A process according to claim 1 wherein the stirrer has a tip speed in the range of 20–30 ft./sec.

4. A process according to claim 1 wherein the initiator is 2,2'-azobisisobutyronitrile.

5. A process according to claim 1 wherein the styrene and acrylamide are added in 50:50 weight ratio.

6. A process according to claim 1 wherein the styrene and acrylamide are added in 90:10 weight ratio.

7. A process according to claim 1 wherein the styrene and acrylamide are added in 10:90 weight ratio.

References Cited

UNITED STATES PATENTS 3,580,877    5/1971    Corry et al. _____ 260—886

HARRY WONG, Jr., Primary Examiner

U.S. Cl. X.R.

117—140, 155, 161; 260—29.6 R, 78.5 R, 80.73, 886

UNITED STATES PATENT OFFICE
CERTIFICATE OF CORRECTION

Patent No. 3,814,742                     Dated June 4, 1974

Inventor(s) DANIEL ELMER NAGY

It is certified that error appears in the above-identified patent and that said Letters Patent are hereby corrected as shown below:

Column 2 line 35.  Change "9:10" to -- 90 : 10 --.
Column 4 line 8.  Change "(0.48 mole)" to -- (0.48 mol) --.

Signed and sealed this 17th day of September 1974.

(SEAL)
Attest:

McCOY M. GIBSON JR.                C. MARSHALL DANN
Attesting Officer                  Commissioner of Patents